May 29, 1951　　　H. P. SERIO　　　2,554,643
HANDLE ATTACHMENT FOR COOKING UTENSILS
Filed Sept. 24, 1946
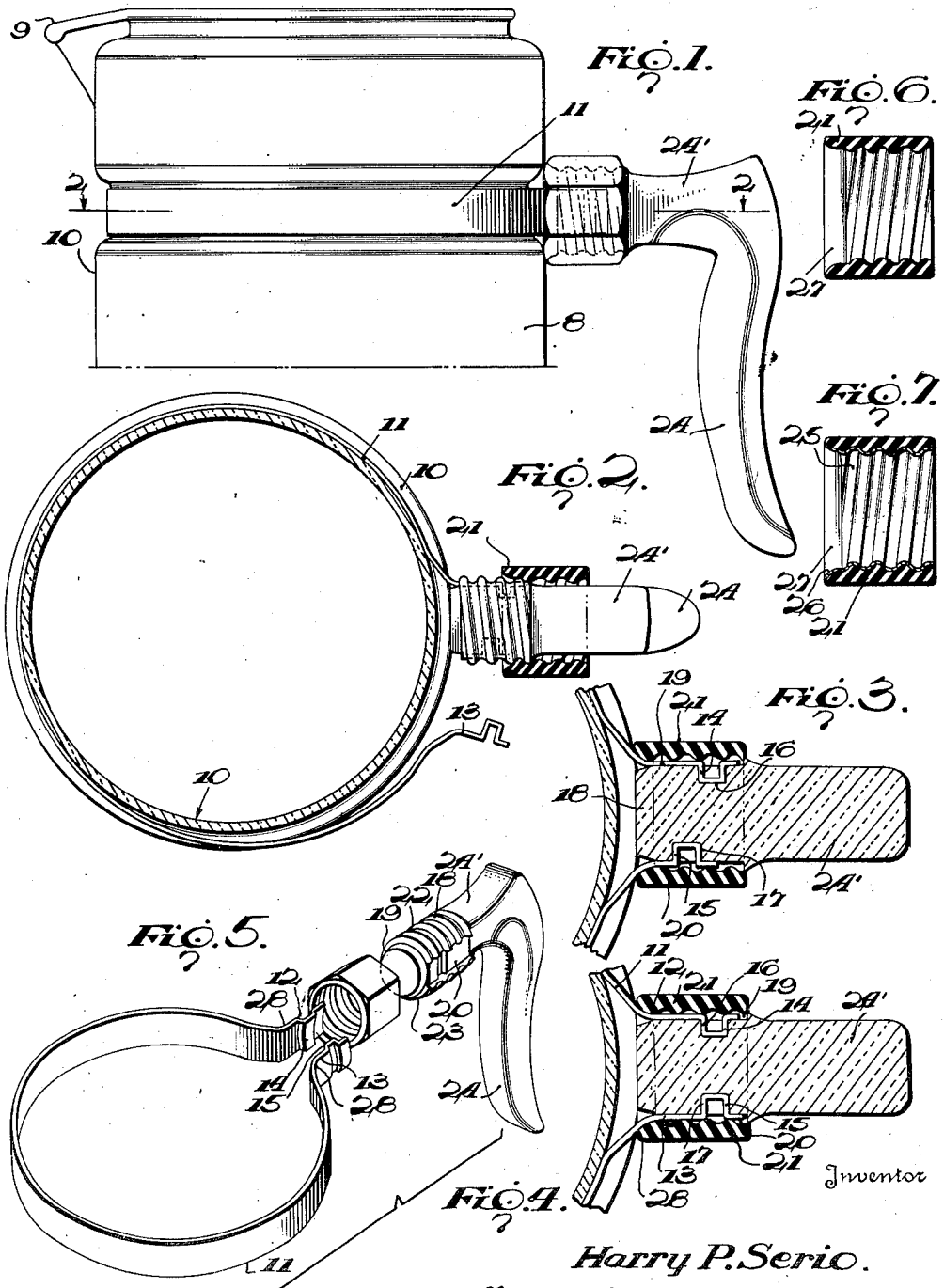
Inventor
Harry P. Serio.
By Shoemaker & Mattare
Attorneys Patented May 29, 1951

2,554,643

UNITED STATES PATENT OFFICE 2,554,643

HANDLE ATTACHMENT FOR COOKING UTENSILS

Harry P. Serio, Elmira, N. Y., assignor of one-half to Anthony W. Serio, Elmira, N. Y.

Application September 24, 1946, Serial No. 698,934

9 Claims. (Cl. 294—27)

1

This invention relates to handle attachments for cooking utensils. The invention is more particularly directed to a handle attachment for cooking utensils embodying a band for encircling the utensil and handle means attached or connected with the free ends of the band.

Considerable difficulty has been encountered in providing a practical, commercially successful, inexpensive handle attachment for glass cooking utensils such as percolators, double boilers, etc., due to the fact that handles attached to such utensils must be rigid and non-movable with respect to the utensil and be capable of ready association with the utensil. Numerous types of handles in the prior art embody bolts and other means for securing the handle to the utensil and others embody the use of bolts or the like in association with a band encircling the utensil and which bolts must be tightened to effect the association of the band and handle with the utensil and in use the bolts pull loose and consequently the band and handle attachment moves with respect to the utensil which of course is very undesirable as the contents of the utensil might be spilled on a person or on a table or other surface and frequently as in percolators the contents of the utensil are hot and if the handle attachment is insecure or movable one might be severely burned.

In my invention I provide a simple, inexpensive band and handle attachment for glass or other cooking utensils wherein the band is substantially circular in outline and is provided with two outwardly directed extensions or free ends which extensions are each provided with means for direct locking association with one end portion of the handle and wherein other means are provided for securing the band and handle in non-movable relationship with respect to the utensil and wherein the assembly of the band and handle attachment for the utensil is quickly and readily applied by inexperienced help. The band and handle attachment consists of three parts, namely, the band, the handle having a partially threaded portion adjacent one end thereof and the means for securing the aforesaid free ends of the band to the handle and the free ends of the band carrying projections either opposite each other or one in advance of the other which are placed in recesses formed in the said end of the handle and a locking nut associated with the handle in screw threaded engagement with the aforesaid partial threaded end portion of the handle and extending over and about the free ends of the band and thereby firmly securing

2 and locking the free ends of the band in fixed relationship with respect to the handle and also with respect to the utensil to which the same is applied. The three aforesaid elements constituting my invention are capable of manufacture in mass production at low cost and the band and handle are capable of long service and proper association with a glass or other cooking utensil or the like and when associated with a utensil eliminates the possibility of the handle being or becoming loose with respect to the utensil and thus providing a very useful handle attachment and one that will not result in accidents in handling the utensil. The band and handle attachment is of course capable of being detached from the utensil and if desired applied to another utensil of substantially the same diameter, but the most practical use is to associate one band and handle attachment with each utensil to remain thereon.

With the foregoing in mind it is an object of my invention to provide a band and handle attachment for cooking or other utensils wherein the band and handle which are two separate elements are readily and quickly associated in proper relationship with the utensil.

Another object of my invention is to provide a band and handle attachment for cooking utensils or the like wherein the band is of substantially circular outline and circumscribes a major portion of a similarly shaped utensil and is provided with outwardly directed extensions, which extensions are provided with means for interlocking relationship with one end portion of a handle and that portion of the handle being partially screw threaded and a nut for engaging the screw threads and enclosing the free ends of the band between the handle and the nut for firmly securing the band and handle to the utensil.

Another object of my invention is to provide a band and handle attachment for cooking utensils and the like wherein the band is of substantially circular outline and is positioned in a circumferential groove in the utensil and has its free ends extending outwardly from the side of the utensil and which ends of the band are provided with means for locking the same with respect to one end portion of the handle and which locking means includes projections in each end of the band which are directly opposite one another or one projection in advance of the other for engagement in similarly formed and arranged recesses in one end of the handle and means for enclosing the said ends of the band and securing these ends in fixed relationship with respect to the handle and which means is capable of movement to contract the band to firmly grip the exterior surface of the utensil thereby fixing the same and the handle with respect to the utensil.

Another object of my invention is to provide a band and handle attachment for cooking utensils and the like wherein the band is of substantially circular outline and is adapted for gripping an exterior portion of the utensil and said band having outwardly directed spaced extensions and which extensions are provided with inwardly directed projections, one in advance of the other for reception in similarly arranged and spaced recesses on one end portion of the handle and that portion of the extension carrying the projection in advance of the other being secured to the end portion of the handle with which it is associated while the other extension is absolutely free of the securing means and thus permitting the band to be slightly expanded and placed about the utensil with or without a circumferential groove therein and when thus placed enabling one to insert the other unsecured end of the band with its projection in a recess out of alignment with the first mentioned recess and then fixedly securing the band and its extended ends to the utensil by moving the securing means which is in the form of a threaded nut on partial screw threads which are formed on the exterior end portion of the handle and such movement of the securing means continuing until the band has been closely contracted and contacting that portion of the utensil with which it is associated and thus firmly securing the band to the utensil and likewise the handle to the band.

Another object of my invention is to provide a band and handle attachment for cooking utensils and the like wherein the band is preferably of stainless steel or other metal and the handle of glass.

With these and other objects in view, the invention consists in the construction and novel combination and arrangement of parts hereinafter fully described, illustrated in the accompanying drawings and pointed out in the claims hereto appended, it being understood that various changes in the form, proportion, and minor details of construction within the scope of the claims, may be resorted to without departing from the spirit or sacrificing any advantages of the invention.

In the drawings:

Fig. 1 is a side elevational view of the band and handle attachment for a cooking utensil such as a percolator, the latter being only partially shown;

Fig. 2 is a cross sectional view substantially on the line 2—2 of Fig. 1 but showing one end portion of the band in locked association with the handle and the other end portion of the band free of the handle and about to be moved to a position for association therewith and securing means in the form of a nut on a portion of the handle;

Fig. 3 is a partial cross sectional view showing the preferred form of the invention;

Fig. 4 is a similar view showing a modification;

Fig. 5 is an exploded perspective view showing the three elements, namely the band, the nut securing means and the handle;

Fig. 6 is a vertical sectional view of the securing nut; and

Fig. 7 is a view similar to Fig. 6 showing a modification of the nut.

The invention will be readily understood by referring to the drawings in detail where like reference numerals in the several figures denote the same parts.

A conventional cooking utensil 8 such as a percolator or the like and preferably of glass is provided with the usual pouring spout 9 at its upper end has formed therein below the upper end a circumferential groove 10. The band 11 which is preferably of stainless steel or other metal but which may be of plastic is substantially circular in outline and is adapted for reception in the circumferential groove 10 as clearly seen in Figs. 1 and 2. This band 11 is provided with free ends 12 and 13 which extend radially outwardly in spaced relationship. The band proper is substantially flat in cross section whereas the extensions 12 and 13 are of substantially concavo convex formation and each of these extensions is provided intermediate their ends with inwardly extending projections 14 and 15 and which projections extend substantially the width of the extensions.

In the preferred form of the invention the projection 14 is in advance of the projection 15, see Fig. 3, or stating it another way the projections 14 and 15 are out of horizontal alignment. The projections 14 and 15 are adapted for reception in similarly formed and arranged recesses 16 and 17 which are likewise out of horizontal alignment or in other words the recess 16 is in advance of the recess 17, viewing Fig. 3 inwardly. The recesses 16 and 17 are formed in the end portion 18 of the handle in diametrically opposite cut out portions or grooves 19 and 20 and which grooves are of sufficient depths throughout their length so that when the free ends 12 and 13 of the band are positioned therein with the respective projections 14 and 15 seated in the recesses 16 and 17 the convex upper surfaces of the said extensions permit the securing means 21 in the form of an interiorly screw threaded plastic nut preferably having a polygonal exterior surface to be engaged with partial or interrupted screw threads 22 and 23 on the upper and lower portions of the handle end 18 and thus the free ends will be firmly secured together at the end of the handle and the band likewise firmly secured about the utensil.

The handle 24 and its end portion 18 are integral and preferably made of glass but of course other such materials as plastic or even metal or wood might be used. In the modification of the invention as depicted in Fig. 4 the band 11 with the extending spaced free ends 12 and 13 are each provided with the inwardly directed locking projections 14 and 15 for reception in recesses 16 and 17 respectively in the end of the glass handle in the same manner as described above except that in Fig. 4 the projections 14 and 15 and likewise the recesses 16 and 17 are in alignment, viewing Fig. 4 and the nut 21 engages screw threads 22 and 23 and extends over or about the said free ends of the band and secures the band to the receptacle and the handle to the band in substantially the same manner as above described but differing in the matter of arrangement of several structural features and the manner of assembly as will be explained later.

The securing nut 21 as shown in Figs. 1 through 6 may be formed entirely of plastic or other similar material but in Fig. 7 this securing nut is shown as made of plastic or other like material and is provided interiorly with a metal liner 25 which has the interior screw threads formed therein. In making this nut 21 as shown in Fig. 7 the metal screw thread liner can, of course be first fabricated and the plastic molded or otherwise placed thereabout. It is to be noted that the nut in Figs. 1 through 6, also in Fig. 7, is provided at its forward end 26 with a beveled surface 27 which beveled surface contactingly engages the curved portions 28 of the band 11 and thus it will be seen that when the nut is brought home on the screw threads 22 and 23 on the end of the handle the band 11 is brought tightly and firmly in engagement with the circumferential portion of the utensils with which it is associated. The end portion 26 of the nut 21 when properly associated with the band and handle about the utensil engages the walls of the utensil as seen in Fig. 1.

The mode of associating the band 11, nut 21 and handle 24 with the utensil in Figs. 1 through 6 is as follows. The end 12 of the band with its projection 14 which is substantially U-shaped in cross section is placed in the groove 19 and the projection 14 is seated in the recess 16 which of course is a very simple operation and then the nut 21 which before assembly is mounted on the horizontal portion 28 of the handle is moved toward the partial screw threads 22 and 23 adjacent the end of the handle and as it engages the first thread or two the extension 12 and consequently the band 11 will be firmly locked and associated with the handle while the other extension 13 as seen in Fig. 2 is entirely free of the nut and the threaded end of the handle. Then that free end extension 13 with its projection 15 is mounted in the groove 20 and its projection 15 seated in the recess 17 and a continued movement screw threading of the nut is employed and thus both of the free ends of the band 11 will be locked and associated with the handle and the continued inwardly threading of the nut on the partial or divided screw threads 22 and 23 results in the tapered end 26 of the nut 21 engaging the curved surfaces 18 of the band 11 until the nut engages a portion of the circumference of the utensil and thus the band 11 will be tightly and fixedly drawn about the utensil whether the band is in a circumferential groove 10 or not and the result is that the band and the handle are both firmly and fixedly associated with the utensil and any possibility of movement of one with respect to the other is prevented.

The assembly of the band and handle as disclosed in Fig. 4 is slightly different than that described above with regard to Figs. 1 through 5. The assembly in Fig. 4 consists in positioning the free ends 12 and 13 in the grooves 19 and 20 with the respective projections 14 and 15 end seated in the recesses 16 and 17 and when this is accomplished the nut 21 is simply screw threaded in engagement with the partial or divided screw threads 22 and 23 and turned home about the screw threads and also the locked free ends 12 and 13 of the band 11 until the nut engages a portion of the circumference of the utensil and firmly and securely fixes the band and handle to the utensil in the same manner as described with respect to the invention as in Figs. 1 through 5.

In both the preferred and modified forms of my invention it will be readily seen that the association of the band with the handle is accomplished very simply in all that it requires is to position the free ends of the band with the projections thereon in recesses in the end of the handle and then turn the securing means in the form of a nut in engagement with the screw threads on the end of the handle and a very effective association of the band and handle with the utensil, whether the latter is glass or not, results.

In view of the fact that the tapered portion 26 of the securing nut 21 engages the curved portions 28 of the free ends of the band 11 it will be seen that one size of band can be applied to utensils of varying diameters as the screw threading of the nut on the end of the handle being in engagement with the curved portions 28 of the band takes care of the difference in associating the one band with utensils of varying diameters.

I claim:

1. A band and handle attachment for utensils, wherein the band encircles a portion of the outer circumference of the utensil and is provided with outwardly extended spaced ends, each of the spaced ends being provided with a projection, the handle having a recess on opposite sides thereof adjacent one end for receiving the projections of the free ends of the band therein, and means for enclosing the said end of the handle and surrounding the free ends of the band for securing the latter to the handle and for tensioning the band about the utensil.

2. A band and handle attachment for glass cooking utensils wherein the utensil is provided with a circumferential groove and the band is seated in the groove, the band having outwardly extending free ends, one end of the handle being provided with grooves in which the free ends of the band are arranged, cooperative locking means on the free ends of the band and in the grooves in the end of the handle, and means for securing the free ends of the band in the grooves in the handle and for tensioning the band about the utensil.

3. A band and handle attachment for cooking utensils wherein the band is substantially circular in outline and is provided with outwardly extending spaced free ends, the free ends of the band having inwardly directed locking projections thereon, and an end portion of the handle having recesses therein with the locking projections seated therein, the said end portion of the handle being screw threaded and a nut for engagement with the screw threads, which nut extends about the free ends of the band and the locking means and serves to secure the band and handle together and to tension the band about the utensil.

4. A band and handle attachment for cooking utensils wherein the band is of substantially circular outline and is provided with outwardly directed spaced free ends, inwardly directed locking projections formed in the free ends of the band, one of which projections is in advance of the other, an end portion of the handle having oppositely disposed recesses therein, one of which recesses is in advance of the other for receiving therein the respective locking projections on the free ends of the band, and means for securing the free ends of the band and the handle together.

5. A band and handle attachment for utensils including a substantially circular band provided with outwardly extending spaced free ends, the free ends having inwardly directed locking projections formed therein, which projections are in horizontal alignment with each other, the end portion of the handle being provided with oppositely disposed recesses which are in horizontal relationship with each other for reception therein of the locking projections on the ends of the band, and means for securing the ends of the band and the handle together and for tensioning the band about a utensil.

6. A band and handle attachment for utensils wherein the band is of substantially circular outline and is provided with outwardly directed spaced free ends, the free ends of the band having inwardly directed locking projections thereon, one end of the handle having oppositely disposed recesses, with the locking projections of the free ends of the band seated therein, the said end of the handle being partially screw-threaded, and a nut engaging the screw threads of the handle and encircling the free ends of the band for securing the latter to the handle and for tensioning the band about a utensil.

7. A band and handle attachment for utensils wherein the band is substantially circular in outline and is provided with outwardly extending spaced free ends, the ends of the band being curved inwardly thereof and beyond the curved portion having inwardly directed locking projections, one end of the handle having oppositely disposed grooves formed therein and oppositely disposed recesses in the said grooves, the said end portion of the handle being partially screw-threaded at opposite sides of the said grooves with the free ends of the band positioned in the grooves and the locking projections in the oppositely disposed recesses, and an interiorly screw threaded securing nut in engagement with the screw threads on the handle and encircling the portions of the ends of the band disposed in the said grooves, with the inner end of the nut engaging the curved portions of the free ends of the band for firmly securing the latter to the utensil and to the handle and for tensioning the band about the utensil.

8. A band and handle attachment for cooking utensils wherein the band is of substantially circular outline and is provided with outwardly directed spaced free ends, inwardly directed locking projections formed in the free ends of the band, one of which projections is in advance of the other, an end portion of the handle having oppositely disposed recesses therein, one of which recesses is in advance of the other for receiving therein the respective locking projections on the free ends of the band, and a tubular member to fit over said end portion of the handle and adjustable longitudinally thereon for securing the free ends of the band and the handle together.

9. A band and handle attachment for cooking utensils wherein the band is of substantially circular outline and is provided with outwardly directed spaced free end members, inwardly directed locking projections formed in the free ends of the band, an end member of the handle having oppositely disposed recesses and screw threads thereon, and an interiorly screw threaded means for engaging the screw threads on the handle for securing the free end portions of the band and the end of the handle together about the utensil, and to tension the band about the utensil.

HARRY P. SERIO.

REFERENCES CITED

The following references are of record in the file of this patent:

UNITED STATES PATENTS

| Number | Name | Date |
|---|---|---|
| 452,381 | Meisselbach | May 19, 1891 |
| 864,103 | Mulroyan | Aug. 20, 1907 |
| 2,305,492 | Poglein | Dec. 15, 1942 |

FOREIGN PATENTS

| Number | Country | Date |
|---|---|---|
| 419,190 | France | Oct. 21, 1910 |